(No Model.)

A. C. SKINNER.
ANIMAL TRAP.

No. 451,163. Patented Apr. 28, 1891.

Witnesses
Geo. E. Frech
H. T. Riley

Inventor
Albert C. Skinner
By his Attorneys,
C. A. Snow & Co.

UNITED STATES PATENT OFFICE.

ALBERT C. SKINNER, OF BUFFALO, MISSOURI, ASSIGNOR OF TWO-THIRDS TO EDMOND L. SCHOFIELD AND THOMAS M. BROWN, BOTH OF SAME PLACE.

ANIMAL-TRAP.

SPECIFICATION forming part of Letters Patent No. 451,163, dated April 28, 1891.

Application filed November 28, 1890. Serial No. 372,896. (No model.)

*To all whom it may concern:*

Be it known that I, ALBERT C. SKINNER, a citizen of the United States, residing at Buffalo, in the county of Dallas and State of Missouri, have invented a new and useful Trap, of which the following is a specification.

The invention relates to improvements in animal-traps.

The object of the present invention is to simplify and improve the construction of animal-traps and enable the same to be readily sprung at the slightest touch of the bait.

The invention consists in the construction and novel combination and arrangement of parts hereinafter fully described, illustrated in the accompanying drawings, and pointed out in the claims hereto appended.

Figure 1:
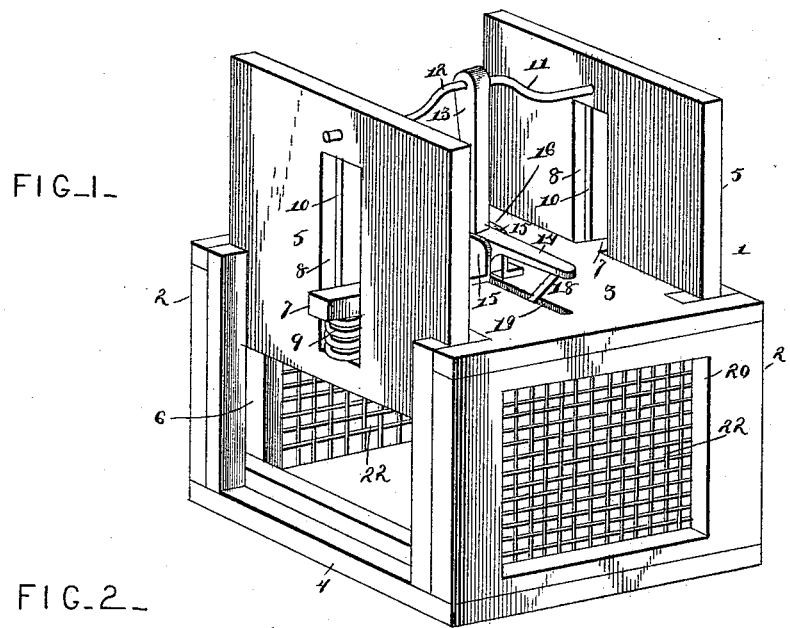
Figure 2:
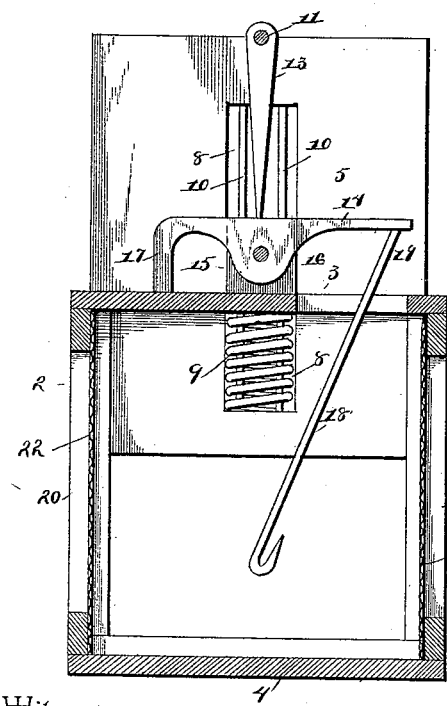
Figure 3:
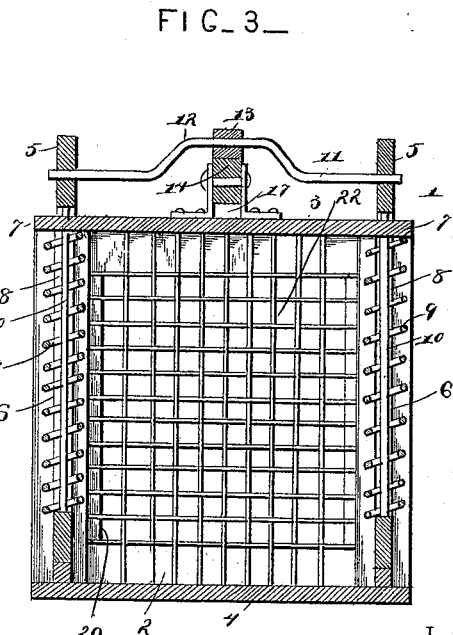

In the drawings, Figure 1 is a perspective view of a trap constructed in accordance with this invention. Fig. 2 is a central vertical sectional view. Fig. 3 is a similar view taken at right angles to Fig. 2.

Referring to the accompanying drawings, 1 designates the frame, consisting of the sides 2, top 3, and bottom 4, and the ends of the frame are provided with sliding doors 5, which are arranged in suitable ways 6, formed by strips secured to the inner faces of the sides 2 at the vertical edges thereof, and the top 3 is recessed at the ends of the frame and provided with projections 7. The vertically-sliding doors are provided with longitudinal openings 8, through which extend the projection 7, against which bear the upper ends of spiral springs 9, coiled around guide-rods 10, arranged within the longitudinal openings 8 and upon opposite sides of the projection 7, and the said springs are compressed when the sliding doors are raised and are adapted to cause the doors to descend with great force when released to confine or kill an animal. The upper ends of the sliding doors are connected by a rod 11, which is provided intermediate its ends with a bend 12, at which point is attached a prop-bar 13, which is provided at one end with a perforation through which passes a rod 11, and the other end is adapted to engage a lever 14 to maintain the sliding doors in an elevated position. The lever 14 is fulcrumed intermediate its ends between upward-extending perforated ears 15 of a bracket 16. One end of the lever 14 is provided with a heel 17, which is adapted to bear against the top of the casing and hold the lever in a horizontal position, and the other end of the lever is attached to a trigger 18, which passes through a slot 19 in the top and has its lower end provided with a bait-hook. When the trap is set and the sliding doors are elevated, the prop-bar is supported on the lever above the pivotal point, and when an animal touches the bait, the lever has one end pulled upon and depressed and forms an inclined plane, down which slides the prop-bar, thereby releasing the sliding doors.

It will thus be seen that an extremely sensitive trap is produced, which is capable of being easily set and readily sprung at the slightest touch of the bait.

The sides 2 are provided with central rectangular openings 20, covered by a gauze 22, which permits the interior of the trap to be inspected.

From the foregoing description and the accompanying drawings the construction, operation, and advantages of the invention will be readily understood.

What I claim is—

1. The combination, in an animal-trap, of the frame or body, the vertically-sliding spring-actuated doors, the rod connecting the doors, the prop-bar hinged to the rod, the lever fulcrumed on top of the frame or body and having one end provided with a heel adapted to hold the lever in a horizontal position to support the prop-bar thereon, and the trigger connected to the other end of the lever and provided with a bait-hook, substantially as described.

2. The combination, in an animal-trap, of the frame or body comprising the sides provided with vertical ways, the bottom, and the top having its ends provided with projections, the sliding doors having longitudinal openings to receive the said projections, the guide-rods arranged within the openings, the springs arranged upon the guide-rods and interposed between the bottom of the openings and the projections, the rod connecting the sliding door, the bracket arranged upon the top of the frame or bottom, the lever fulcrumed in the bracket and provided at one end with a heel arranged to hold the lever in a horizontal position, the trigger arranged at the other end of the lever and provided with a bait-hook, and the prop-bar hinged to the rods connecting the doors and adapted to be supported on said lever, substantially as described.

In testimony that I claim the foregoing as my own I have hereto affixed my signature in presence of two witnesses.

ALBERT C. SKINNER.

Witnesses:
W. W. FAIRLAMB,
J. J. EGAN.